United States Patent
Negreanu et al.

(10) Patent No.: US 9,657,189 B2
(45) Date of Patent: May 23, 2017

(54) ELECTROSTATIC INKS AND PRINTING

(75) Inventors: Eyal Negreanu, Rishon le-zion (IL); Rada Nuchimov, Rehovot (IL); Vladislav Kaploun, Rehovot (IL); Gregory Katz, Holon (IL); Inbar Adi, Rehovot (IL); Yaron Grinwald, Meitar (IL); Reut Avigdor, Modiin (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 14/395,863

(22) PCT Filed: May 31, 2012

(86) PCT No.: PCT/EP2012/060249
§ 371 (c)(1),
(2), (4) Date: Oct. 21, 2014

(87) PCT Pub. No.: WO2013/178265
PCT Pub. Date: Dec. 5, 2013

(65) Prior Publication Data
US 2015/0064424 A1     Mar. 5, 2015

(51) Int. Cl.
*C09D 11/52* (2014.01)
*C08K 3/08* (2006.01)
*C09D 11/037* (2014.01)
*G03G 9/12* (2006.01)
*G03G 9/125* (2006.01)

(52) U.S. Cl.
CPC ............ *C09D 11/52* (2013.01); *C08K 3/08* (2013.01); *C09D 11/037* (2013.01); *G03G 9/122* (2013.01); *G03G 9/125* (2013.01); *C08K 2003/0812* (2013.01); *Y10T 428/24901* (2015.01)

(58) Field of Classification Search
CPC .. C09D 11/00; C09D 11/52; Y10T 428/24802
See application file for complete search history.

(56) References Cited

U.S. PATENT DOCUMENTS

| | | | |
|---|---|---|---|
| 5,045,425 A | 9/1991 | Swidler | |
| 5,066,559 A | 11/1991 | Elmasry et al. | |
| 5,723,250 A | 3/1998 | Matsuoka et al. | |
| 7,670,742 B2 | 3/2010 | Tsubuko et al. | |
| 2002/0186288 A1* | 12/2002 | Nakazawa | C09D 11/30 347/100 |
| 2003/0084820 A1* | 5/2003 | Okamoto et al. | 106/401 |
| 2003/0225185 A1* | 12/2003 | Akers, Jr. | B82Y 30/00 523/160 |
| 2004/0055508 A1* | 3/2004 | Miyamoto et al. | 106/31.47 |
| 2004/0094067 A1* | 5/2004 | Oyanagi | B41J 2/1433 106/31.58 |
| 2011/0123228 A1* | 5/2011 | Roditi et al. | 399/237 |
| 2011/0183254 A1 | 7/2011 | Shoshi et al. | |
| 2011/0318053 A1 | 12/2011 | Yamashita et al. | |

FOREIGN PATENT DOCUMENTS

| | | |
|---|---|---|
| CN | 1616561 | 5/2005 |
| CN | 101429357 | 5/2009 |
| EP | 1518908 | 3/2005 |
| EP | 2042569 | 4/2009 |
| WO | WO 2011/110221 | 9/2011 |

OTHER PUBLICATIONS

Chemicai Book, Succinimide (http://www.chemicalbook.com/ChemicalProductProperty_EN_CB4852973.htm) issued Feb. 21, 2012.
Guidechem, Succinimide (http://www.guidechem.com/dictionary/123-56-8.html) issued Feb. 21, 2012.
Lubrizol technical data sheet. Lubrizol® 2153, Lubrizol® 6406, "Non-ionic pigment dispersants for solvent-free and solvent-based inks and coatings", issued May 2006.

* cited by examiner

*Primary Examiner* — Gerard Higgins
*Assistant Examiner* — Sathavaram I Reddy
(74) *Attorney, Agent, or Firm* — Dierker & Kavanaugh, P.C.

(57) ABSTRACT

There is provided a method of producing an electrostatic ink composition, the method comprising: mixing a resin, a liquid carrier, and a conductive metallic pigment having a coating of surfactant thereon, to form an electrostatic ink composition comprising the resin and the conductive metallic pigment dispersed in the liquid carrier. An electrostatic ink composition and a substrate are also described.

18 Claims, 1 Drawing Sheet

ELECTROSTATIC INKS AND PRINTING

Electrostatic printing processes typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate. Variations of this method utilize different ways for forming the electrostatic latent image on a photoreceptor or on a dielectric material.

DETAILED DESCRIPTION

Figure 1:
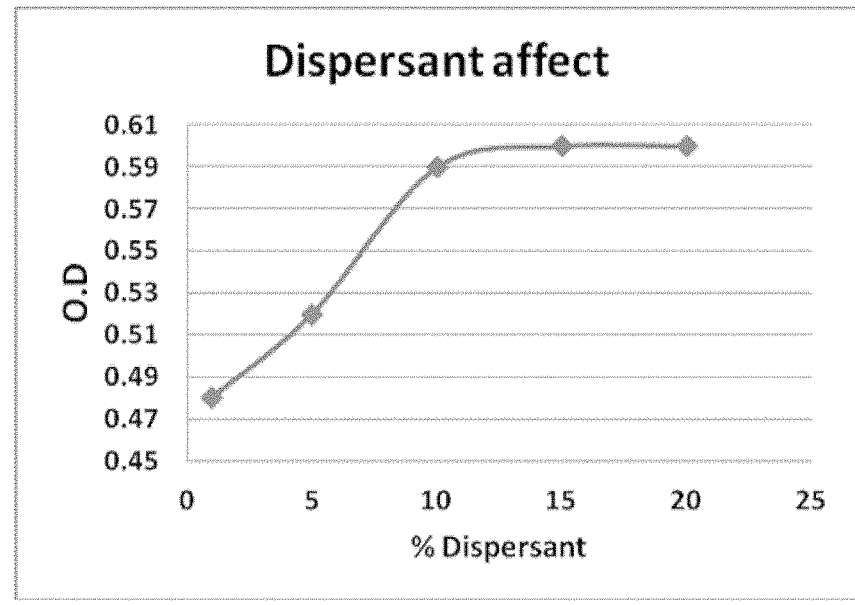
FIG. 1 shows the effect of varying the amount of dispersant added to the metallic pigments in the initial preparation stage on the optical density of ink printed using the metallic pigments.

Before the present invention is disclosed and described, it is to be understood that this invention is not limited to the particular process steps and materials disclosed herein because such process steps and materials may vary somewhat. It is also to be understood that the terminology used herein is used for the purpose of describing particular examples only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other additives can be dispersed to form a liquid electrostatic ink or electrophotographic ink. Such carrier liquids and vehicle components are known in the art. Typical carrier liquids can include a mixture of a variety of different agents, such as surfactants, co-solvents, viscosity modifiers, and/or other possible ingredients.

As used herein, "electrostatic ink composition" generally refers to an ink composition that is typically suitable for use in an electrostatic printing process, sometimes termed an electrophotographic printing process.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 1000 V/cm or more, or in some examples 1500 V/cm or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In a first aspect, there is provided a method of producing an electrostatic ink composition, the method comprising:
mixing a resin, a liquid carrier, and a conductive metallic pigment having a coating of surfactant thereon, to form an electrostatic ink composition comprising the resin and the conductive metallic pigment dispersed in the liquid carrier.

In a second aspect, there is provided an electrostatic ink composition comprising
   a liquid carrier
   particles dispersed in the liquid carrier, wherein the particles comprise a resin and a conductive metallic pigment, wherein the conductive metallic pigment has a coating of surfactant thereon.

In a third aspect, there is provided a print substrate having printed thereon an electrostatic ink comprising a resin and a conductive metallic pigment, wherein the conductive metallic pigment has a coating of surfactant thereon.

The method described herein involves mixing a resin, a liquid carrier, and a conductive metallic pigment having a coating of surfactant thereon. This forms an electrostatic ink composition comprising the resin and the conductive metallic pigment dispersed in the liquid carrier. In some examples, the conductive metallic pigment has a coating of surfactant thereon before the mixing of the resin, the liquid carrier, and the conductive metallic pigment. The surfactant may form a partial or full surface covering on the pigment.

The conductive metallic pigment, in the present application, indicates an electrically conductive metallic pigment. The conductive metallic pigment comprises a metal. The metal may be a metal in elemental form or an alloy of two or more metals. The conductive metallic pigment may comprise a metal selected from aluminium, tin, a transition metal, and alloys of any one of more thereof. The transition metal may be selected from, for example, zinc, copper, silver, gold, nickel, palladium, platinum, and iron. Alloys that may be used include, but are not limited to, brass, bronze, steel and chromium.

The conductive metallic pigment, in any of the aspects herein, may have any three-dimensional shape. In some examples, the conductive metallic pigment is in the form selected from a flake, a sphere, a rod, or approximations thereof. In the present application, a flake may be a shape with a first dimension, which may be termed a thickness, less than the other two dimensions. In some examples, the flake has a thickness of at least 0.01 µm, in some examples a thickness of at least 0.05 µm, in some examples a thickness of at least 0.05 µm, in some examples a thickness of at least 0.1 µm, in some examples a thickness of at least 0.15 µm, in some examples a thickness of at least 0.18 µm. In some examples, the flake has a thickness of 1 µm or less, in some examples a thickness of 0.8 µm or less, in some examples a thickness of 0.5 µm or less, in some examples a thickness of 0.4 µm or less, in some examples a thickness of 0.3 µm or less.

In some examples, the flake has a diameter, measured in a direction perpendicular to the thickness, of at least 1 µm, in some examples a diameter of at least 2 µm, in some examples a diameter of at least 3 µm, in some examples a diameter of at least 4 µm, in some examples a diameter of at least 5 µm, in some examples a diameter of at least 6 µm, in some examples a diameter of at least 7 µm, in some examples a diameter of at least 8 µm. In some examples, the flake has a diameter, measured in a direction perpendicular to the thickness, of 50 µm or less, in some examples a diameter of 40 µm or less, in some examples a diameter of 30 µm or less, in some examples a diameter of 20 µm or less, in some examples a diameter of 15 µm or less.

In some examples, the conductive metallic pigment has an aspect ratio of a diameter (measured in a direction perpendicular to the thickness) to its thickness of n:1, where n is at least 2, in some examples at least 5, in some examples at least 10, in some examples at least 20, in some examples at least 30, in some examples at least 35. In some examples, the conductive metallic pigment has an aspect ratio of a diameter (measured in a direction perpendicular to the thickness) to its thickness of n:1, where n is 100 or less, in some examples n is 80 or less, in some examples n is 70 or less, in some examples n is 60 or less, in some examples n is 50 or less.

In some examples, the conductive metallic pigments, excluding any surfactant thereon, constitute 15% or less by weight of the solids in the ink composition of the second aspect or the ink composition produced in the first aspect. In some examples, the conductive metallic pigments, excluding any surfactant thereon, constitute 12% or less by weight, in some examples 10% or less by weight, in some examples 8% or less by weight of the solids in the ink composition of the second aspect and/or the ink composition produced in the first aspect and/or the electrostatic ink of the third aspect.

In some examples, the conductive metallic pigments, excluding any surfactant thereon, constitute 1% or more by weight, in some examples 2% or more by weight, in some examples 4% or more by weight, in some examples 6% or more by weight by weight, in some examples 8% or more by weight, of the solids in the ink composition of the second aspect and/or the ink composition produced in the first aspect and/or the electrostatic ink of the third aspect. The inventors have found that by keeping the amount of conductive pigments below 15 wt %, particularly at 12 wt % or less, of the solids of the ink composition, the likelihood of discharge from the particles during the electrostatic printing process (e.g. when being transferred from one part of a printing apparatus to another under high electric field) is reduced.

Generally, the liquid carrier acts as a dispersing medium for the other components in the liquid electrophotographic ink. For example, the liquid carrier can comprise or be a hydrocarbon, silicone oil, vegetable oil, etc. The liquid carrier can include, but is not limited to, an insulating, non-polar, non-aqueous liquid that is used as the medium for toner particles. The liquid carrier can include compounds that have a resistivity in excess of about $10^9$ ohm-cm. The liquid carrier may have a dielectric constant below about 5, in some examples below about 3.

The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, IsoparG™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™). The liquid carriers and other components of the present disclosure are described in U.S. Pat. No. 6,337,168, U.S. Pat. No. 6,070,042, and U.S. Pat. No. 5,192,638, all of which are incorporated herein by reference.

In an example, the liquid carrier constitutes about 20 to 99.5% by weight of the electrostatic ink composition, in some examples about 50 to 99.5% by weight of the electrostatic ink composition, for example as produced in accordance with the first aspect or in accordance with the second aspect. In another example, the liquid carrier may constitute about 40 to 90% by weight of the electrostatic ink composition. In another example, the liquid carrier may constitute about 60 to 80% by weight of the electrostatic ink composition, for example as produced in accordance with the first aspect or in accordance with the third aspect. In another example, the liquid carrier may constitute about 90 to 99.5% by weight of the electrostatic ink composition, in some examples 95 to 99% by weight of the electrostatic ink composition, for example as produced in accordance with the first aspect or in accordance with the second aspect.

The resin typically includes a polymer. The resin can include, but is not limited to, a thermoplastic polymer. In some examples, the polymer of the resin may be selected from ethylene acrylic acid copolymers; methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a co-polymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In an example, the resin constitutes about 5 to 90%, in some examples about 5 to 80%, by weight of the solids of the electrostatic ink composition. In another example, the resin constitutes about 10 to 60% by weight of the solids of the electrostatic ink composition. In another example, the resin constitutes about 15 to 40% by weight of the solids of the electrostatic ink composition. In another example, the resin constitutes about 60 to 95% by weight, in some examples from 80 to 90% by weight, of the solids of the electrostatic ink composition.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the resin can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

In some examples, the method comprises providing a resin and a conductive metallic pigment having a coating of surfactant thereon, and grinding the resin and conductive metallic pigment in a mill, for example a ball mill, and wherein the liquid carrier is added before, during or after the grinding. In an embodiment, the liquid carrier is present during the grinding of the resin and conductive metallic pigment in a mill; and in some examples, the liquid carrier constitutes 10 to 30% by weight of the composition being ground in the mill, in some examples 12 to 25% by weight of the composition being ground in the mill, in some examples 15 to 25% by weight of the composition being ground in the mill, in some examples 15 to 21% by weight of the composition being ground in the mill. The grinding in a mill may be carried out by rotating the mixture such that the RPM of the rotations is at least 100 RPM, in some examples at least 200 RPM, in some examples at least 250 RPM; and in some examples the grinding may be carried out for a period of at least 1 hour, in some examples 2 hours, in some examples 3 hours in some examples 4 hours, in some examples 5 hours. The temperature during grinding may be at least 25° C., in some examples at least 30° C., in some examples at least 35° C. A suitable grinding mill is a ball mill or attritor. A commercially available attritor is available from Union Process, such as a Union S1-attritor.

In some examples, the method comprises providing a resin and a conductive metallic pigment having a coating of surfactant thereon, then mixing the resin and the conductive metallic pigment having a coating of surfactant thereon in a continuous mixer to form a compounded mixture, then adding the liquid carrier to the compounded mixture to form the electrostatic ink composition. The compounded mixture may contain particles comprising the resin and the conductive metallic pigment coated by the surfactant; the resin in the particles may partially or fully encapsulate the conductive metallic pigments. The liquid carrier may be added in the same continuous mixer, e.g. extruder, in which the resin and conductive metallic pigment have previously been mixed. In an alternative example, the compounded mixture may be removed from the continuous mixer in which the resin and conductive metallic pigment have been mixed, and then the liquid carrier added, for example in a mixing apparatus, which may be a continuous mixer or other type of mixing apparatus, such as a ball mill.

After addition of the liquid carrier, the method may involve removing at least some particles above a predetermined size. The removing of the particle above a predetermined size may involve filtering the mixture comprising the liquid carrier, the resin and the conductive metallic pigment. In some examples, the removing of the particle above a predetermined size may involve subjecting the mixture comprising the liquid carrier, the resin and the conductive metallic pigment to a centrifugal process.

The continuous mixer may be an extruder. In some examples, the continuous mixer may be a twin-screw extruder.

The extruder may comprise one or more screws, in some examples two screws, such as in a twin-screw extruder. The one or more screws may rotate at a speed of at least 200 rpm, in some examples at least 400 rpm, in some example at least 600 rpm, in some examples at least 700 rpm, in some examples at least 800 rpm. The one or more screws may rotate at a speed of 1000 rpm or less, in some examples 900 rpm or less, in some examples 800 rpm or less, in some examples 700 rpm or less, in some examples 600 rpm or less, in some examples 500 rpm or less, in some examples 400 rpm or less, in some examples 300 rpm or less. The one or more screws may rotate at a speed of from 100 rpm to 500 rpm, in some examples from 200 rpm to 400 rpm, in some examples from 250 rpm to 300 rpm. In some examples, the extruder comprises at least two interlocking or intermeshing co-rotating screws. This arrangement of screws has been found to be particularly advantageous in being able to mix the conductive metallic pigments and the resin to a high degree without damaging, at least to any significant effect, the conductive metallic pigments, and forming particles of resin that encapsulate the conductive metallic pigments. The amount of material, which may be the amount of solids excluding any liquid material, being extruded by the extruder per hour may be at least 1 kg, in some examples at least 2 kg, in some examples at least 3 kg. The amount of material, which may be the amount of solids excluding any liquid material, being extruded by the extruder per hour may be 10 kg or less, in some examples 7 kg or less, in some examples 5 kg or less, in some examples 4 kg or less, in some examples 4 kg or less, in some examples 3 kg or less. The amount of material, which may be the amount of solids excluding any liquid material, being extruded by the extruder per hour may be from 1 to 5 kg, in some examples 2 kg to 4 kg, in some examples 2.5 kg to 3.5 kg.

The mixing of the resin and conductive metallic pigment in the continuous mixer may be carried out at a temperature of 80° C. or more, in some examples 90° C. or more, in some examples, 95° C. or more, in some examples 100° C. or more.

In some examples, the liquid carrier is added to the compounded mixture in the continuous mixer, in some examples after the resin and a conductive metallic pigment having a coating of surfactant thereon have been mixed in the continuous mixer.

The surfactant may be soluble in the liquid carrier. The surfactant may be an oil-soluble surfactant. The surfactant may be a surfactant soluble in a hydrocarbon liquid carrier.

In some examples, the surfactant may be selected from anionic surfactant, cationic surfactant, amphoteric surfactant, non-ionic surfactant, polymeric surfactant, oligomeric surfactant, crosslinking surfactant, or combinations thereof.

The anionic surfactant may be or comprise sulfosuccinic acid and derivatives thereof such as, for instance, alkyl sulfosuccinates (e.g., GEROPON® SBFA-30 and GEROPON® SSO-75, both of which are manufactured by Rhodia, Boulogne-Billancourt, France) and docusate sodium.

The cationic surfactant may be selected from quaternary amine polymers, protonated amine polymers, and polymers containing aluminum (such as those that are available from Lubrizol Corp., Wickliffe, Ohio). Further examples of cationic surfactants include SOLSPERSE® 2155, 9000, 13650, 13940, and 19000 (Lubrizol Corp.) and other like cationic surfactants.

The amphoteric surfactant may be selected from surfactants that contain compounds having protonizable groups and/or ionizable acid groups. An example of a suitable amphoteric surfactant includes lecithin.

The non-ionic surfactant may be selected from oil-soluble polyesters, polyamines, polyacrylates, polymethacrylates (such as, e.g., SOLSPERSE® 3000 (Lubrizol Corp.), SOLSPERSE® 21000 (Lubrizol Corp.), or the like.

The oligomeric surfacant may be selected from low average molecular weight (i.e., less than 1000) non-ionic surfactants.

The cross-linking surfactant may be selected from polymers or oligomers containing two or more carbon double bonds (C=C) and/or free amine groups such as, e.g., polyamines, crosslinkable polyurethanes, and divinyl benzene.

Other suitable surfactants include OS#13309AP, OS#13309AQ, 14179BL, and 45479AB from Lubrizol Corp, which are surfactants based on polyisobutylene succinic acid with polyethyleneimines. These surfactants are combination polymers that are cationic in nature.

Surfactants typically comprise a head group and a tail group, with the head group and tail group typically of different polarity, e.g. the head group being polar and the tail group being relatively non-polar compared to the head group. The surfactant may comprise an acidic head group, e.g. a head group comprising a carboxylic acid. The surfactant may comprise a basic head group. Basic head groups have been found to be more efficacious than acid head groups, particularly in the final appearance of the printed ink. The basic head group may comprise an amine group, which may be selected from a primary amine group and a secondary amine group. The basic head group may comprise a plurality of amine groups, which may each independently be selected from a primary amine group and a secondary amine group.

In some examples, the surfactant comprises a succinimide. The succinimide may be linked, e.g. via a hydrocarbon-containing linker group, to an amine group. In some examples, the surfactant comprises a polyisobutylene succinimide having a head group comprising an amine.

In some examples, the surfactant is of formula (I)

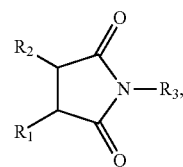

formula (I)

wherein $R_1$, $R_2$ and $R_3$ are selected from an amine-containing head group, a hydrocarbon tail group and hydrogen, wherein at least one of $R_1$, $R_2$ and $R_3$ comprises a hydrocarbon tail group, at least one of $R_1$, $R_2$ and $R_3$ comprises an amine-containing head group. In some examples, $R_1$ and $R_2$ are selected from a hydrocarbon tail group and hydrogen, with at least one of $R_1$ and $R_2$ comprising a hydrocarbon tail group, and $R_3$ comprises an amine-containing head group. The hydrocarbon tail group may comprise or be a hydrocarbon group, which may be branched or straight chain and may be unsubstituted. The hydrocarbon tail group may comprise or be a hydrocarbon group containing a polyalkylene, which may be selected from a polyethylene, polypropylene, polybutylene. In some examples, the hydrocarbon tail group may contain a polyisobutylene. The hydrocarbon tail group may contain from 10 to 100 carbons, in some examples from 10 to 50 carbons, in some examples from 10 to 30 carbons. The hydrocarbon tail group may be of the formula (II)

$$P-L-\qquad\text{formula (II),}$$

wherein P is or comprises polyisobutylene and L is selected from a single bond, $(CH_2)_n$, wherein n is from 0 to 5, in some examples 1 to 5, —O— and —NH—. In some examples, the amine-containing head group comprises or is a hydrocarbon group having an amine group attached to one of the carbons of the hydrocarbon group. In some examples, the amine-containing head group is of the formula (III)

$$(CH_2)_m[(CH_2)_oNH(CH_2)_p]_q(CH_2)_r—NH_2\qquad\text{formula (III),}$$

wherein m is at least 1, in some examples 1 to 5, q is 0 to 10, o is 0, 1 or 2, p is 1 or 2, r is 0 to 10; in some examples, m is 1, o is 1, p is 1 and q is from 0 to 10, in some examples from 1 to 5, and in some examples r is 1 to 5; in some examples m is 1, q is 0 to 10, in some examples 1 to 10, in some examples 1 to 5, o is 1, p is 1, r is 1.

In some examples, the surfactant is of formula (I), wherein $R_1$ is of formula (II), $R_2$ is H and $R_3$ is of formula (III). IN some examples, the surfactant is of formula (I), wherein $R_1$ is of formula (II), wherein L is —$CH_2$—, $R_2$ is H and $R_3$ is of formula (III), wherein m is 1, q is 0 to 10, in some examples 1 to 10, in some examples 1 to 5, o is 1, p is 1 and r is 1.

The coating of the surfactant on the conductive metallic pigment may be produced using any suitable method. The coating of the surfactant on the conductive metallic pigment may be produced by contacting conductive metallic pigment not having a coating of surfactant thereon with the surfactant, which, in some examples, is in a liquid medium. In some examples, the conductive metallic pigment having a coating of surfactant thereon is produced by or producible by contacting a conductive metallic pigment not having a coating of surfactant thereon with a liquid medium containing the surfactant until a coating of the surfactant is formed on the conductive metallic pigment. The liquid medium may contain at least 1% by weight of the surfactant, before contacting with the conductive metallic pigment. The liquid medium may contain at least 2% by weight, in some examples at least 3% by weight, in some examples at least 4% by weight, in some examples at least 5% by weight, of the surfactant before contacting with the conductive metallic pigment. The liquid medium may contain 20% or less by weight of the surfactant, before contacting with the conductive metallic pigment. The liquid medium may contain 15% or less by weight of the surfactant, before contacting with the conductive metallic pigment. The liquid medium may contain from 2 to 10% by weight of the surfactant, before contacting with the conductive metallic pigment. After contacting of the surfactant with the conductive metallic pigment and during coating of the surfactant on the conductive metallic pigment, the mixture or the solids content of the mixture may comprise at least 10 wt % conductive metallic pigment, in some examples at least 20 wt % conductive metallic pigment, in some examples from 10 to 50 wt % conductive metallic pigment, in some examples 20 to 40 wt % conductive metallic pigment, in some examples 25 to 25 wt % conductive metallic pigment. In some examples, the liquid medium is of the same type as the liquid carrier. In some examples, the liquid medium comprises a hydrocarbon liquid.

In some examples, the contacting of the contacting conductive metallic pigment not having a coating of surfactant thereon with the surfactant involves mixing the metallic pigment and the surfactant and then agitating the mixture, for example by a method involving one or more of shaking, high shear mixing and/or subjecting the mixture to ultrasound.

The high shear mixing may involve stirring the mixture, for example at a high speed, for example a speed of at least 1000 RPM, in some examples at least 5000 RPM, in some examples at least 10,000 RPM, in some examples at least 15,000 RPM, in some examples at least 20,000. The stirring may be carried out for a period of at least 30 minutes, in some examples at least 1 hour in some examples at least hour 30 minutes. In some examples, the stirring may be carried out at least 10,000 RPM for at least 30 minutes, in some examples at least 20,000 RPM for at least 1 hour.

Subjecting the mixture to ultrasound may involve subjecting the mixture to ultrasound for a period of at least 30 minutes, in some examples at least 60 minutes, in some examples at least 90 minutes.

The electrostatic ink composition produced by the method of the first aspect and/or the electrostatic ink composition of the second aspect may contain at least some particles having a particle size of 100 μm or less, in some examples a particle size of 50 μm or less, in some examples a particle size of 30 μm or less, in some examples a particle size of 20 μm or less, in some examples a particle size of 10 μm or less. In some examples, at least 90% by volume of the particles in the electrostatic ink composition produced by the method of the first aspect and/or the electrostatic ink composition of the second aspect have a particle size of 100 μm or less, in some examples a particle size of 50 μm or less, in some examples a particle size of 30 μm or less, in some examples a particle size of 20 μm or less. Particle size may be measured using any suitable technique, for example using a particle analyzer. Particle analyzers are commercially available, e.g. a Malvern Mastersizer® 2000.

In the electrostatic ink composition produced by the method of the first aspect and/or the electrostatic ink composition of the second aspect may contain a charge adjuvant. The charge adjuvant may be added during any stage of the method, for example before, during or after the mixing, e.g. grinding, of the resin and conductive metallic pigment with the liquid carrier. The charge adjuvant may comprise an aluminium salt. The charge adjuvant may comprise a fatty acid metal salt. In an example, the charge adjuvant may comprise a fatty acid aluminium salt. In an example, the charge adjuvant is or comprises an aluminium stearate, e.g. an aluminium di- or tri-stearate.

Further provided is a composition, e.g. an electrostatic ink composition, produced according to the method of the first aspect. The electrostatic ink composition may comprise:

a liquid carrier, particles dispersed in the liquid carrier, wherein the particles comprise a resin and a conductive metallic pigment, wherein the conductive metallic pigment has a coating of surfactant thereon. In some examples, the electrostatic ink composition comprises a plurality of particles, each of which comprises the resin and a plurality of conductive metallic pigments, which may be partially or fully encapsulated by the resin.

Also provided is a method of electrophotographic printing an electrostatic ink composition as described herein, for example as produced in accordance with the first aspect or in accordance with the second aspect, wherein the ink composition comprises particles comprising the resin, the conductive metallic pigment dispersed in the liquid carrier, the method comprising:

forming a latent electrostatic image on a surface;

contacting the surface with the electrostatic ink composition, such that at least some of the particles adhere to the surface to form a developed toner image on the surface, and transferring the toner image to a print substrate.

The surface on which the latent electrostatic image is formed may be on a rotating member, e.g. in the form of a cylinder. The surface on which the latent electrostatic image is formed may form part of a photo imaging plate (PIP). The contacting may involve passing the electrostatic composition between a stationary electrode and a rotating member, which may be a member having the surface having a latent electrostatic image thereon or a member in contact with the surface having a latent electrostatic image thereon. A voltage is applied between the stationary electrode and the rotating member, such that the particles adhere to the surface of the rotating member. This may involve subjecting the electrostatic ink composition to an electric field having a field gradient of 50-400V/µm, or more, in some examples 600-900V/µm, or more.

The intermediate transfer member may be a rotating flexible member, which is in some examples heated, e.g. to a temperature of from 80 to 160° C., in some examples from 90 to 130° C., in some examples from 100 to 110° C.

The method of electrophotographic printing may be carried out so that a plurality of impressions or copies are carried out. The number of impressions or copies may be at least 1000, in some examples at least 2000, in some examples at least 3000, in some examples at least 5000. The print coverage on each print substrate in each impression may be 40% or less, in some examples 30% or less, in some examples 20% or less. An impression may be a single image of one colour formed on a print substrate. A copy may be a single image having a plurality of colours, e.g. selected from black, magenta, cyan and yellow.

The method of electrophotographic printing may be carried out so that a plurality of print substrate sheets are printed, for example 250 or more print substrate sheets, in some examples 500 or more print substrate sheets, in some examples 750 or more print substrate sheets, in some examples 1000 or more print substrate sheets. The sheets may be any suitable size or shape, e.g. of standard printing size, such as A4 or A3.

Also provided herein is a print substrate printed using the electrostatic ink composition described herein, for example as produced in accordance with the first aspect or in accordance with the second aspect. In some examples is provided a print substrate having printed thereon an electrostatic ink comprising a resin and a conductive metallic pigment, wherein the conductive metallic pigment has a coating of surfactant thereon.

The print substrate may be any suitable substrate. The substrate may be any suitable substrate capable of having an image printed thereon. The substrate may comprise a material selected from an organic or inorganic material. The material may comprise a natural polymeric material, e.g. cellulose. The material may comprise a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may comprise a metal, which may be in sheet form. The metal may be selected from or made from, for instance, aluminum (Al), silver (Ag), tin (Sn), copper (Cu), mixtures thereof. In an example, the substrate comprises a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print.

EXAMPLES

The following examples illustrate a number of variations of the present compositions and methods that are presently known to the inventors. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present compositions and methods have been described above with particularity, the following examples provide further detail in connection with what are presently deemed to be acceptable.

Example 1—Producing Pretreated Pigment

In the examples below, the aluminum flakes had 8 µm diameter and 0.2 µm thickness (#12541 from Schlenk, Ge).

The Aluminum flakes pigment were dispersed in Isopar containing 3% of LUB6406 (Lubrizol) at 30% (by weight) solids concentration. The dispersion was shaken overnight and then left to stand for a week to let the pigments form a sediment. The rest of the fluid was decanted out leaving the treated pigment at 60% solids.

Example 2—Grinding and Working Dispersion

The 60% treated pigment, i.e. as produced in accordance with Example 1, was added to a grinding chamber (S1—Union Process) with resin resins (Nucrel 699, available from Dupont and A-C 5120, available from Honeywell in the relative weight:weight ratio of 80:20 and other additives: 2% Al-distearate, available from Riedel de-Haan (sometimes termed VCA) and the dispersant LUB6406 in different percentages (3-20%). The mixture in the grinding chamber was then ground for 5 hours at 35° C. (mixture during grinding contained 18% by weight non volatile solids, with the remaining liquid portion of the mixture being Isopar liquid). After the grinding, the resultant milled composition was then diluted to 2 wt % solids, charged working dispersion.

Example 3—Pretreated Pigment with SP3000

The Aluminum flakes pigment were dispersed in Isopar containing 3% of SP3000 at 30% solids concentration. The treated pigment was then tested in the same manner as Examples 2 to 4 above.

Printing Test—

Preliminary printing tests showed comparable response of the metallic electrostatic ink compositions to standard electrostatic ink compositions in the development unit voltages. The printer used was Gilboa, HP indigo WS6000 web press (ser. 3). The output prints of new metallic ink came with very high metallic look (graphic view) compared to our reference and with lower background.

Effect of Amount of Dispersant on Optical Density

FIG. 1 shows the influence of dispersant addition on the optical density. It can be seen that as the dispersant percentage is increased, the optical density increased, up to saturation above 10% on solids. The optical density is believed to increase due to the thicker layer of pigments deposited on a page.

Methods of Pre-Treating the Pigments

Several methods of pre-treating the pigment was compared:
  Shaking—The aluminum flake pigments were dispersed in Isopar containing different percentage of LUB6406 (3, 10, 15, 20%). The dispersion was set for shaking overnight and added to resin in a grinding process, similar to that described above in Example 2.
  High shear mixer—The Aluminum flake pigments were dispersed in Isopar containing the dispersant LUB6406 followed by treatment with high shear mixer. The high shear instrument used was T 25 by IKA which is a high-performance dispersing instrument for volumes from 1-2 L. Mechanical force is created by rotor/stator movement. The high shear treatment was performed for 1.5 h at 20,000 RPM. The aim was to achieve good dispersion and prevent percolation.
  Ultrasonic—The same procedure as above using the high shear mixer, followed by ultrasonic bath treatment for 1.5 hours.

A comparison between the above methods revealed that all the treatments helped to achieve better metallic look with relatively lower background although treated pigment with ultrasonic resulted in slightly better results. Shaking and high shear mixing showed approximately the same results. The reason for that may be related to the fact that ultrasonic is a stronger instrument to get better dispersion. However, the results from the other methods were sufficient for the product.

Metallic Appearance

The Flop Index (F.I) is the parameter which indicates metallic appearance.

F.I measures the change in reflectance of a metallic color as it is rotated through the range of viewing angles. There are several Flop Index equations, but most are based on the difference between the reflectance near specular and the reflectance far from specular, all divided by the reflectance at an intermediate angle.

The equation for calculating flop index:

$$\text{Flop Index} = \frac{2.69(L^*_{15°} - L^*_{110°})^{1.11}}{(L^*_{45°})^{0.86}}$$

Figure 2:
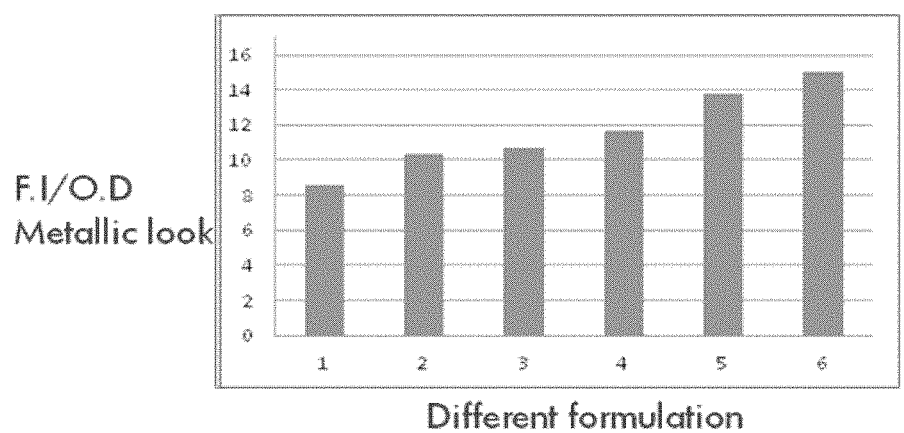
FIG. 2 shows the Flop Index/Optical Density (as described in the Examples) for various formulations, as described in the Examples.

FIG. 2 shows the Flop Index (F.I)/Optical Density (O.D) in different formulations. The changes related to pigment loading, amount of dispersant and grinding conditions.

Table 1 below shows the conditions of testing and components for the various electrostatic ink compositions tested. In the table below, 'F' indicates Nucrel 699, available from Dupont and 'ACE' indicates A-C 5120, available from Honeywell. VCA indicates aluminium distearate. 'PL' indicates particle loading, i.e. the weight percent of conductive pigment in the solids content of the composition. OD indicates optical density. FI indicates flop index. 'Two hits' indicates the test was carried out twice and the value given represents the average of the two results obtained.

TABLE 1

| Number = X | Resin | PL | 6406 [%] | % VCA | OD two hits | FI two hits | BKG OD | F.I/O.D [A] |
|---|---|---|---|---|---|---|---|---|
| 1(Ref) | F/ACE | 25 | N/A | none | 0.48 | 5.9 | 0.09 | 12 |
| 2 | F/ACE | 13 | 13 | 2 | 0.49 | 4.2 | 0.1 | 9 |
| 3 | F/ACE | 15 | 15 | 2 | 0.58 | 6 | 0.11 | 10 |
| 4 | F/ACE | 15 | 15 | 2 | 0.45 | 4.8 | 0.08 | 11 |
| 5 | F/ACE | 18 | 18 | 2 | 0.6 | 7.01 | 0.12 | 12 |
| 6 | F/ACE | 25 | 20 | 2 | 0.61 | 8.6 | 0.16 | 14 |

While the compositions, methods and related aspects have been described with reference to certain embodiments, those skilled in the art will appreciate that various modifications, changes, omissions, and substitutions can be made without departing from the spirit of the disclosure. It is intended, therefore, that the compositions, methods and related aspects be limited only by the scope of the following claims. Unless otherwise stated, the features of any dependent claim can be combined with the features of any of the other dependent claims.

The invention claimed is:

1. A method of producing an electrostatic ink composition, the method comprising:
  mixing a resin, a hydrocarbon liquid carrier, and a conductive metallic pigment having a coating of surfactant thereon, to form an electrostatic ink composition including particles formed from the resin and the conductive metallic pigment having the coating of surfactant thereon, wherein the particles are dispersed in the liquid carrier, wherein the mixing consists of:
    providing the resin and the conductive metallic pigment having the coating of surfactant thereon;
    mixing the resin and the conductive metallic pigment having the coating of surfactant thereon to form a compounded mixture consisting of the particles, wherein the resin in the particles partially or fully encapsulates the conductive metallic pigment having the coating of surfactant thereon; and
    after the mixing to form the compounded mixture, adding the hydrocarbon liquid carrier to the compounded mixture to form the electrostatic ink composition.

2. The method according to claim 1, wherein the mixing of the resin and the conductive metallic pigment having the coating of surfactant thereon is accomplished in a continuous mixer.

3. The method according to claim 1, wherein the conductive metallic pigment having the coating of surfactant thereon is produced by contacting a conductive metallic pigment not having a coating of surfactant thereon with a liquid medium containing the surfactant until the coating of the surfactant is formed on the conductive metallic pigment.

4. The method according to claim 3, wherein the liquid medium contains from 2 to 10% by weight of the surfactant, before contacting with the conductive metallic pigment.

5. The method according to claim 3, wherein the liquid medium comprises a hydrocarbon liquid.

6. The method according to claim 1, wherein the conductive metallic pigment comprises a metal selected from aluminium, tin, a transition metal, and alloys thereof.

7. The method according to claim 1, wherein the conductive metallic pigment is in the form of flakes.

8. The method according to claim 1, wherein the conductive metallic pigment is in the form of flakes, wherein at least one flake of the flakes has a thickness of from 0.01 µm to 2 µm.

9. The method according to claim 1, wherein the conductive metallic pigment is in the form of flakes, wherein at least one flake of the flakes has a maximum diameter of 50 µm or less.

10. The method according to claim 1, wherein the surfactant comprises a basic head group.

11. The method according to claim 1, wherein the resin includes a polymer selected from the group consisting of ethylene acrylic acid copolymers; methacrylic acid copolymers; ethylene vinyl acetate copolymers; copolymers of ethylene and alkyl esters of methacrylic or acrylic acid; copolymers of ethylene, acrylic or methacrylic acid and alkyl esters of methacrylic or acrylic acid; polyethylene; polystyrene; isotactic polypropylene; ethylene ethyl acrylate; polyesters; polyvinyl toluene; polyamides; styrene/butadiene copolymers; ethylene-acrylate terpolymers: ethylene-acrylic esters-maleic anhydride (MAH) or glycidyl methacrylate (GMA) terpolymers; ethylene-acrylic acid ionomers and combinations thereof.

12. The method according to claim 1, wherein the hydrocarbon liquid carrier is selected from the group consisting of aliphatic hydrocarbons, isomerized aliphatic hydrocarbons, branched chain aliphatic hydrocarbons, aromatic hydrocarbons, and combinations thereof.

13. A method of producing an electrostatic ink composition, the method comprising:
mixing a resin, a liquid carrier, and a conductive metallic pigment having a coating of surfactant thereon, to form an electrostatic ink composition comprising the resin and the conductive metallic pigment dispersed in the liquid carrier, wherein the surfactant comprises a succinimide.

14. A method of producing an electrostatic ink composition, the method comprising:
mixing a resin, a liquid carrier, and a conductive metallic pigment having a coating of surfactant thereon, to form an electrostatic ink composition comprising the resin and the conductive metallic pigment dispersed in the liquid carrier, wherein the surfactant comprises a polyisobutylene succinimide having a head group comprising an amine.

15. An electrostatic ink composition, comprising:
a hydrocarbon liquid carrier; and
particles dispersed in the hydrocarbon liquid carrier, wherein the particles comprise a resin and a conductive metallic pigment, wherein the conductive metallic pigment has a coating of surfactant thereon, and wherein the surfactant includes a succinimide.

16. The electrostatic ink composition according to claim 15, wherein the resin includes a polymer selected from the group consisting of ethylene acrylic acid copolymers; methacrylic acid copolymers; ethylene vinyl acetate copolymers; copolymers of ethylene and alkyl esters of methacrylic or acrylic acid; copolymers of ethylene, acrylic or methacrylic acid and alkyl esters of methacrylic or acrylic acid; polyethylene; polystyrene; isotactic polypropylene; ethylene ethyl acrylate; polyesters; polyvinyl toluene; polyamides; styrene/butadiene copolymers; ethylene-acrylate terpolymers: ethylene-acrylic esters-maleic anhydride (MAH) or glycidyl methacrylate (GMA) terpolymers; ethylene-acrylic acid ionomers and combinations thereof.

17. The electrostatic ink composition according to claim 15, wherein the hydrocarbon liquid carrier is selected from the group consisting of aliphatic hydrocarbons, isomerized aliphatic hydrocarbons, branched chain aliphatic hydrocarbons, aromatic hydrocarbons, and combinations thereof.

18. The electrostatic ink composition according to claim 15, wherein the resin in the particles partially or fully encapsulates the conductive metallic pigment.

* * * * *